United States Patent
Jones et al.

(10) Patent No.: US 6,425,241 B1
(45) Date of Patent: *Jul. 30, 2002

(54) PYROMETER MOUNT FOR A CLOSED-CIRCUIT THERMAL MEDIUM COOLED GAS TURBINE

(75) Inventors: Raymond Joseph Jones, Duanesburg; Francis Lawrence Kirkpatrick, deceased, late of Galway, by Barbara Tomczak, administrator; James Lee Burns, Schenectady; John Robert Fulton, Clifton Park, all of NY (US)

(73) Assignee: General Electric Company, Schenectady, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/400,863

(22) Filed: Sep. 21, 1999

(51) Int. Cl.$^7$ ................................................ F02G 1/00
(52) U.S. Cl. ..................................................... 60/39.33
(58) Field of Search ............................ 60/39.33, 39.54, 60/39.58; 415/114

(56) References Cited

U.S. PATENT DOCUMENTS

| | | | |
|---|---|---|---|
| 3,778,170 A | * 12/1973 | Howell et al. | 356/241 |
| 3,917,432 A | * 11/1975 | Feuerstein et al. | 415/118 |
| 3,936,217 A | * 2/1976 | Travaglini et al. | 415/118 |
| 4,011,017 A | * 3/1977 | Feuerstein et al. | 356/241 |
| 4,194,400 A | * 3/1980 | Staff | 73/623 |
| 4,306,835 A | * 12/1981 | Hurley | |
| 4,591,794 A | * 5/1986 | Shattuck et al. | |
| 4,668,162 A | * 5/1987 | Cederwall et al. | 415/115 |
| 4,815,276 A | * 3/1989 | Hamsel et al. | 60/39.33 |
| 5,185,996 A | * 2/1993 | Smith et al. | |
| 5,320,483 A | * 6/1994 | Cunha et al. | 415/114 |
| 5,340,274 A | * 8/1994 | Cunha | 415/115 |
| 5,421,652 A | * 6/1995 | Kast et al. | |
| 5,867,976 A | * 2/1999 | Ziegler, Jr. | 60/39.33 |

OTHER PUBLICATIONS

"39$^{th}$ GE Turbine State-of-the-Art Technology Seminar", Tab 1, ""F" Technology –the First Half–Million Operating Hours", H. E. Miller, Aug. 1996.

"39th GE Turbine State-of-the-Art Technology Seminar", Tab 2, "GE Heavy–Duty Gas Turbine Performance Characteristics", F. J. Brooks, Aug. 1996.

"39th GE Turbine State-of-the-Art Technology Seminar", Tab 3, "9EC 50Hz 170–MW Class Gas Turbine", A. S. Arrao, Aug. 1996.

"39th GE Turbine State-of-the-Art Technology Seminar", Tab 4, "MWS6001FA –An Advanced–Technology 70–MW Class 50/60 Hz Gas Turbine", Ramachandran et al., Aug. 1996.

(List continued on next page.)

Primary Examiner—Timothy S. Thorpe
Assistant Examiner—W. Rodriguez
(74) Attorney, Agent, or Firm—Nixon & Vanderhye

(57) ABSTRACT

A steam-cooled second-stage nozzle segment has an outer band and an outer cover defining a plenum therebetween for receiving cooling steam for flow through the nozzles to the inner band and cover therefor and return flow through the nozzles. To measure the temperature of the buckets of the stage forwardly of the nozzle stage, a pyrometer boss is electron beam-welded in an opening through the outer band and TIG-welded to the outer cover plate. By machining a hole through the boss and seating a linearly extending tube in the boss, a line of sight between a pyrometer mounted on the turbine frame and the buckets is provided whereby the temperature of the buckets can be ascertained. The welding of the boss to the outer band and outer cover enables steam flow through the plenum without leakage, while providing a line of sight through the outer cover and outer band to measure bucket temperature.

9 Claims, 4 Drawing Sheets

OTHER PUBLICATIONS

"39th GE Turbine State–of–the–Art Technology Seminar", Tab 5, "Turbomachinery Technology Advances at Nuovo Pignone", Benvenuti et al., Aug. 1996.

"39th GE Turbine State–of–the–Art Technology Seminar", Tab 6, "GE Aeroderivative Gas Turbines –Design and Operating Features", M. W. Horner, Aug. 1996.

"39th GE Turbine State–of–the–Art Technology Seminar", Tab 7, "Advance Gas Turbine Materials and Coatings", P. W. Schilke, Aug. 1996.

"39th GE Turbine State–of–the–Art Technology Seminar", Tab 8, "Dry Low $NO_x$ Combustion Systems for GE Heavy–Duty Turbines", L. B. Davis, Aug. 1996.

"39th GE Turbine State–of–the–Art Technology Seminar", Tab 9, "GE Gas Turbine Combustion Flexibility", M. A. Davi, Aug. 1996.

"39th GE Turbine State–of–the–Art Technology Seminar", Tab 10, "Gas Fuel Clean–Up System Design Considerations for GE Heavy–Duty Gas Turbines", C. Wilkes, Aug. 1996.

"39th GE Turbine State–of–the–Art Technology Seminar", Tab 11, "Integrated Control Systems for Advanced Combined Cycles", Chu et al., Aug. 1996.

"39th GE Turbine State–of–the–Art Technology Seminar", Tab 12, "Power Systems for the 21st Century "H" Gas Turbine Combined Cycles", Paul et al., Aug. 1996.

"39th GE Turbine State–of–the–Art Technology Seminar", Tab 13, "Clean Coal and Heavy Oil Technologies for Gas Turbines", D. M. Todd, Aug. 1996.

"39th GE Turbine State–of–the–Art Technology Seminar", Tab 14, "Gas Turbine Conversions, Modifications and Uprates Technology", Stuck et al., Aug. 1996.

"39th GE Turbine State–of–the–Art Technology Seminar", Tab 15, "Performance and Reliability Improvements for Heavy–Duty Gas Turbines, " J. R. Johnston, Aug. 1996.

"39th GE Turbine State–of–the–Art Technology Seminar", Tab 16, "Gas Turbine Repair Technology", Crimi et al, Aug. 1996.

"39th GE Turbine State–of–the–Art Technology Seminar", Tab 17, "Heavy Duty Turbine Operating & Maintenance Considerations", R. F. Hoeft, Aug. 1996.

"39th GE Turbine State–of–the–Art Technology Seminar", Tab 18, "Gas Turbine Performance Monitoring and Testing", Schmitt et al., Aug. 1996.

"39th GE Turbine State–of–the–Art Technology Seminar", Tab 19, "Monitoring Service Delivery System and Diagnostics", Madej et al., Aug. 1996.

"39th GE Turbine State–of–the–Art Technology Seminar", Tab 20, "Steam Turbines for Large Power Applications", Reinker et al., Aug. 1996.

"39th GE Turbine State–of–the–Art Technology Seminar", Tab 21, "Steam Turbines for Ultrasupercritical Power Plants", Retzlaff et al., Aug. 1996.

"39th GE Turbine State–of–the–Art Technology Seminar", Tab 22, "Steam Turbine Sustained Efficiency", P. Schofield, Aug. 1996.

"39th GE Turbine State–of–the–Art Technology Seminar", Tab 23, "Recent Advances in Steam Turbines for Industrial and Cogeneration Applications", Leger et al., Aug. 1996.

"39th GE Turbine State–of–the–Art Technology Seminar", Tab 24, "Mechanical Drive Steam Turbines", D. R. Leger, Aug. 1996.

"39th GE Turbine State–of–the–Art Technology Seminar", Tab 25, "Steam Turbines for STAG™ Combined–Cycle Power Systems", M. Boss, Aug. 1996.

"39th GE Turbine State–of–the–Art Technology Seminar", Tab 26, "Cogeneration Application Considerations", Fisk et al., Aug. 1996.

"39th GE Turbine State–of–the–Art Technology Seminar", Tab 27, "Performance and Economic Considerations of Repowering Steam Power Plants", Stoll et al., Aug. 1996.

"39th GE Turbine State–of–the–Art Technology Seminar", Tab 28, "High–Power–Density™ Steam Turbine Design Evolution", J. H. Moore, Aug. 1996.

"39th GE Turbine State–of–the–Art Technology Seminar", Tab 29, "Advances in Steam Path Technologies", Cofer, IV, et al., Aug. 1996.

"39th GE Turbine State–of–the–Art Technology Seminar", Tab 30, "Upgradable Opportunities for Steam Turbines", D. R. Dreier, Jr., Aug. 1996.

"39th GE Turbine State–of–the–Art Technology Seminar", Tab 31, "Uprate Options for Industrial Turbines", R. C. Beck, Aug. 1996.

"39th GE Turbine State–of–the–Art Technology Seminar", Tab 32, "Thermal Performance Evaluation and Assessment of Steam Turbine Units", P. Albert, Aug. 1996.

"39th GE Turbine State–of–the–Art Technology Seminar", Tab 33, "Advances in Welding Repair Technology" J. F. Nolan, Aug. 1996.

"39th GE Turbine State–of–the–Art Technology Seminar", Tab 34, "Operation and Maintenance Strategies to Enhance Plant Profitability", MacGillivray et al., Aug. 1996.

"39th GE Turbine State–of–the–Art Technology Seminar", Tab 35, "Generator Insitu Inspections", D. Stanton.

"39th GE Turbine State–of–the–Art Technology Seminar", Tab 36, "Generator Upgrade and Rewind", Halpern et al., Aug. 1996.

"39th GE Turbine State–of–the–Art Technology Seminar", Tab 37, "GE Combined Cycle Product Line and Performance", Chase, et al., Aug. 1996.

"39th GE Turbine State–of–the–Art Technology Seminar", Tab 38, "GE Combined Cycle Experience", Maslak et al., Aug. 1996.

"39th GE Turbine State–of–the–Art Technology Seminar", Tab 39, "Single–Shaft Combined Cycle Power Generations Systems", Tomlinson et al., Aug. 1996.

"Advanced Turbine System Program –Conceptual Design and Product Development", Annual Report, Sep. 1, 1994 – Aug. 31, 1995.

"Advanced Turbine Systems (ATS Program) Conceptual Design and Product Development", Final Technical Progress Report, vol. 2–Industrial Machine, Mar. 31, 1997, Morgantown, WV.

"Advanced Turbine Systems (ATS Program), Conceptual Design and Product Development", Final Technical Progress Report, Aug. 31, 1996, Morgantown, WV.

"Advanced Turbine Systems (ATS) Program, Phase 2, Conceptual Design and Product Development", Yearly Technical Progress Report, Reporting Period: Aug. 25, 1993 –Aug. 31, 1994.

"Advanced Turbine Systems" Annual Program Review, Preprints, Nov. 2–4, 1998, Washington, D.C. U.S. Department of Energy, Office of Industrial Technologies Federal Energy Technology Center.

"ATS Conference", Oct. 28, 1999, Slide Presentation.

"Baglan Bay Launch Site", various articles relating to Baglan Energy Park.

"Baglan Energy Park", Brochure.

"Commercialization", Del Williamson, Present, Global Sales, May 8, 1998.

"Environmental, Health and Safety Assessment: ATS 7H Program (Phase 3R) Test Activities at the GE Power Systems Gas Turbine Manufacturing Facility, Greenville, SC", Document #1753, Feb. 1998, Publication Date: Nov. 17, 1998, Report Numbers DE–FC21–95MC31176—11.

"Exhibit panels used at 1995 product introduction at PowerGen Europe".

"Extensive Testing Program Validates High Efficiency, reliability of GE's Advanced "H" Gas Turbine Technology", Press Information, Press Release, 96–NR14, Jun. 26, 1996, H Technology Tests/pp. 1–4.

"Extensive Testing Program Validates High Efficiency, Reliability of GE's Advanced "H" Gas Turbine Technology", GE Introduces Advanced Gas Turbine Technology Platform: First to Reach 60% Combined–Cycle Power Plant Efficiency, Press Information, Press Release, Power–Gen Europe '95, 95–NRR15, Advanced Technology Introduction/pp. 1–6.

"Gas, Steam Turbine Work as Single Unit in GE's Advanced H Technology Combined–Cycle System", Press Information, Press Release, 95–NR18, May 16, 1995, Advanced Technology Introduction/pp. 1–3.

"GE Breaks 60% Net Efficiency Barrier" paper, 4 pages.

"GE Businesses Share Technologies and Experts to Develop State–Of–The–Art Products", Press Information, Press Release 95–NR10, May 16, 1995, GE Technology Transfer/pp. 1–3.

"General Electric ATS Program Technical Review, Phase 2 Activities", T. Chance et al., pp. 1–4.

"General Electric's DOE/ATS H Gas Turbine Development" Advanced Turbine Systems Annual Review Meeting, Nov. 7–8, 1996, Washington, D.C., Publication Release.

"H Technology Commercialization", 1998 MarComm Activity Recommendation, Mar., 1998.

"H Technology", Jon Ebacher, VP, Power Gen Technology, May 8, 1998.

"H Testing Process", Jon Ebacher, VP, Power Gen Technology, May 8, 1998.

"Heavy–Duty & Aeroderivative Products" Gas Turbines, Brochure, 1998.

"MS7001H/MS9001H Gas Turbine, gepower.com website for PowerGen Europe" Jun. 1–3 going public Jun. 15, (1995).

"New Steam Cooling System is a Key to 60% Efficiency For GE "H" Technology Combined–Cycle Systems", Press Information, Press Release, 95–NRR16, May 16, 1995, H Technology/pp. 1–3.

"Overview of GE's H Gas Turbine Combined Cycle", Jul. 1, 1995 to Dec. 31, 1997.

"Power Systems for the $21^{st}$ Century –"H" Gas Turbine Combined Cycles", Thomas C. Paul et al., Report,.

"Power–Gen '96 Europe", Conference Programme, Budapest, Hungary, Jun. 26–28, 1996.

"Power–Gen International", 1998 Show Guide, Dec. 9–11, 1998, Orange County Convention Center, Orlando, Florida.

"Press Coverage following 1995 product announcement", various newspaper clippings relating to improved generator.

"Proceedings of the Advanced Turbine Systems Annual Program Review Meeting", vol. I, "Industrial Advanced Turbine Systems Program Overview", D. W. Esbeck, pp. 3–13, Oct., 1995.

"Proceedings of the Advanced Turbine Systems Annual Program Review Meeting", vol. I, "H Gas Turbine Combined Cycle", J. Corman, pp. 14–21, Oct., 1995.

"Proceedings of the Advanced Turbine Systems Annual Program Review Meeting", vol. I, "Overview of Westinghouse's Advanced Turbine Systems Program", Bannister et al., pp. 22–30, Oct., 1995.

"Proceedings of the Advanced Turbine Systems Annual Program Review Meeting", vol. I, "Allison Engine ATS Program Technical Review", D. Mukavetz, pp. 31–42, Oct., 1995.

"Proceedings of the Advanced Turbine Systems Annual Program Review Meeting", vol. I, "Advanced Turbine Systems Program Industrial System Concept Development", S. Gates, pp. 43–63, Oct., 1995.

"Proceedings of the Advanced Turbine Systems Annual Program Review Meeting", vol. I, "Advanced Turbine System Program Phase 2 Cycle Selection", Latcovich, Jr., pp. 64–69, Oct., 1995.

"Proceedings of the Advanced Turbine Systems Annual Program Review Meeting", vol. I, "General Electric ATS Program Technical Review Phase 2 Activities", Chance et al., pp. 70–74, Oct., 1995.

"Proceedings of the Advanced Turbine Systems Annual Program Review Meeting", vol. I, "Technical Review of Westinghouse's Advanced Turbine Systems Program", Diakunchak et al., pp. 75–86, Oct., 1995.

"Proceedings of the Advanced Turbine Systems Annual Program Review Meeting", vol. I, "Advanced Combustion Turbines and Cycles: An EPRI Perspective", Touchton et al., pp. 87–88, Oct., 1995.

"Proceedings of the Advanced Turbine Systems Annual Program Review Meeting", vol. I, "Advanced Turbine Systems Annual Program Review", William E. Koop, pp. 89–92, Oct., 1995.

"Proceedings of the Advanced Turbine Systems Annual Program Review Meeting", vol. I, "The AGTSR Consortium: An Update", Fant et al., pp. 93–102, Oct., 1995.

"Proceedings of the Advanced Turbine Systems Annual Program Review Meeting", vol. I, "Overview of Allison/AGTSR Interactions", Sy A. Ali, pp. 103–106, Oct., 1995.

"Proceedings of the Advanced Turbine Systems Annual Program Review Meeting", vol. I, "Design Factors for Stable Lean Premix Combustion", Richards et al., pp. 107–113, Oct., 1995.

"Proceedings of the Advanced Turbine Systems Annual Program Review Meeting", vol. I, "Ceramic Stationary as Turbine", M. van Roode, pp. 114–147, Oct., 1995.

"Proceedings of the Advanced Turbine Systems Annual Program Review Meeting", vol. I, "DOE/Allison Ceramic Vane Effort", Wenglarz et al., pp. 148–151, Oct., 1995.

"Proceedings of the Advanced Turbine Systems Annual Program Review Meeting", vol. I, "Material/Manufacturing Element of the Advanced Turbine Systems Program", Karnitz et al., pp. 152–160, Oct., 1995.

"Proceedings of the Advanced Turbine Systems Annual Program Review Meeting", vol. I, "Land–Based Turbine Casting Initiative", Mueller et al., pp. 161–170, Oct., 1995.

"Proceedings of the Advanced Turbine Systems Annual Program Review Meeting", vol. I, "Turbine Airfoil Manufacturing Technology", Kortovich, pp. 171–181, Oct., 1995.

"Proceedings of the Advanced Turbine Systems Annual Program Review Meeting", vol. I, "Pratt & Whitney Thermal Barrier Coatings", Bornstein et al., pp. 182–193, Oct., 1995.

"Proceedings of the Advanced Turbine Systems Annual Program Review Meeting", vol. I, "Westinhouse Thermal Barrier Coatings", Goedjen et al., pp. 194–199, Oct., 1995.

"Proceedings of the Advanced Turbine Systems Annual Program Review Meeting", vol. I, "High Performance Steam Development", Duffy et al., pp. 200–220, Oct., 1995.

"Proceedings of the Advanced Turbine Systems Annual Program Review Meeting", vol. II, "Lean Premixed Combustion Stabilized by Radiation Feedback and heterogeneous Catalysis", Dibble et al., pp. 221–232, Oct., 1995.

"Proceedings of the Advanced Turbine Systems Annual Program Review Meeting", vol. II, Rayleigh/Raman/LIF Measurements in a Turbulent Lean Premixed Combustor, Nandula et al. pp. 233–248, Oct., 1995.

"Proceedings of the Advanced Turbine Systems Annual Program Review Meeting", vol. II, "Lean Premixed Flames for Low $NO_x$ Combustors", Sojka et al., pp. 249–275, Oct., 1995.

"Proceedings of the Advanced Turbine Systems Annual Program Review Meeting", vol. II, "Functionally Gradient Materials for Thermal Barrier Coatings in Advanced Gas Turbine Systems", Banovic et al., pp. 276–280, Oct., 1995.

"Proceedings of the Advanced Turbine Systems Annual Program Review Meeting", vol. II, "Advanced Turbine Cooling, Heat Transfer, and Aerodynamic Studies", Han et al., pp. 281–309, Oct., 1995.

"Proceedings of the Advanced Turbine Systems Annual Program Review Meeting", vol. II, "Life Prediction of Advanced Materials for Gas Turbine Application", Zamrik et al., pp. 310–327, Oct., 1995.

"Proceedings of the Advanced Turbine Systems Annual Program Review Meeting", vol. II, "Advanced Combustion Technologies for Gas Turbine Power Plants", Vandsburger et al., pp. 328–352, Oct., 1995.

"Proceedings of the Advanced Turbine Systems Annual Program Review Meeting", vol. II, "Combustion Modeling in Advanced Gas Turbine Systems", Smoot et al., pp. 353–370, Oct., 1995.

"Proceedings of the Advanced Turbine Systems Annual Program Review Meeting", vol. II, "Heat Transfer in a Two–Pass Internally Ribbed Turbine Blade Coolant Channel with Cylindrical Vortex Generators", Hibbs et al, pp. 371–390, Oct., 1995.

"Proceedings of the Advanced Turbine Systems Annual Program Review Meeting", vol. II, "Rotational Effects on Turbine Blade Cooling", Govatzidakia et al., pp. 391–392, Oct., 1995.

"Proceedings of the Advanced Turbine Systems Annual Program Review Meeting", vol. II, "Manifold Methods for Methane Combustion", Yang et al., pp. 393–409, Oct., 1995.

"Proceedings of the Advanced Turbine Systems Annual Program Review Meeting", vol. II, "Advanced Multistage Turbine Blade Aerodynamics, Performance, Cooling, and Heat Transfer", Fleeter et al., pp. 410–414, Oct., 1995.

"Proceedings of the Advanced Turbine Systems Annual Program Review Meeting", vol. II, The Role of Reactant Unmixedness, Stain Rate, and Length Scale on Premixed Combustor Performance, Samuelsen et al., pp. 415–422, Oct., 1995.

"Proceedings of the Advanced Turbine Systems Annual Program Review Meeting", vol. II, "Experimental and Computational Studies of Film Cooling With Compound Angle Injection", Goldstein et al., pp. 423–451, Oct., 1995.

"Proceedings of the Advanced Turbine Systems Annual Program Review Meeting", vol. II, "Compatibility of Gas Turbine Materials with Steam Cooling", Desai et al., pp. 452–464, Oct., 1995.

"Proceedings of the Advanced Turbine Systems Annual Program Review Meeting", vol. II, "Use of a Laser–Induced Fluorescence Thermal Imaging System for Film Cooling Heat Transfer Measurement", M. K. Chyu, pp. 465–473, Oct., 1995.

"Proceedings of the Advanced Turbine Systems Annual Program Review Meeting", vol. II, Effects of Geometry on Slot–Jet Film Cooling Performance, Hyams et al., pp. 474–496 Oct., 1995.

"Proceedings of the Advanced Turbine Systems Annual Program Review Meeting", vol. II, "Steam as Turbine Blade Coolant: Experimental Data Generation", Wilmsen et al., pp. 497–505, Oct., 1995.

"Proceedings of the Advanced Turbine Systems Annual Program Review Meeting", vol. II, "Combustion Chemical Vapor Deposited Coatings for Thermal Barrier Coating Systems", Hampikian et al., pp. 506–515, Oct., 1995.

"Proceedings of the Advanced Turbine Systems Annual Program Review Meeting", vol. II, "Premixed Burner Experiments: Geometry, Mixing, and Flame Structure Issues", Gupta et al., pp. 516–528, Oct., 1995.

"Proceedings of the Advanced Turbine Systems Annual Program Review Meeting", vol. II, "Intercooler Flow Path for Gas Turbines: CFD Design and Experiments", Agrawal et al., pp. 529–538, Oct., 1995.

"Proceedings of the Advanced Turbine Systems Annual Program Review Meeting", vol. II, "Bond Strength and Stress Measurements in Thermal Barrier Coatings", Gell et al., pp. 539–549, Oct., 1995.

"Proceedings of the Advanced Turbine Systems Annual Program Review Meeting", vol. II, "Active Control of Combustion Instabilities in Low $NO_x$ Gas Turbines", Zinn et al., pp. 550–551, Oct., 1995.

"Proceedings of the Advanced Turbine Systems Annual Program Review Meeting", vol. II, "Combustion Instability Modeling and Analysis", Santoro et al., pp. 552–559, Oct., 1995.

"Proceedings of the Advanced Turbine Systems Annual Program Review Meeting", vol. II, "Flow and Heat Transfer in Gas Turbine Disk Cavities Subject to Nonuniform External Pressure Field", Roy et al., pp. 560–565, Oct., 1995.

"Proceedings of the Advanced Turbine Systems Annual Program Review Meeting", vol. II, "Heat Pipe Turbine Vane Cooling", Langston et al., pp. 566–572, Oct., 1995.

"Proceedings of the Advanced Turbine Systems Annual Program Review Meeting", vol. II, "Improved Modeling Techniques for Turbomachinery Flow Fields", Lakshminarayana et al., pp. 573–581, Oct., 1995.

"Proceedings of the Advanced Turbine Systems Annual Program Review Meeting", vol. II, "Advanced 3D Inverse Method for Designing Turbomachine Blades", T. Dang, p. 582, Oct., 1995.

"Proceedings of the Advanced Turbine Systems Annual Program Review Meeting", "ATS and the Industries of the Future", Denise Swink, p. 1, Nov., 1996.

"Proceedings of the Advanced Turbine Systems Annual Program Review Meeting", "Gas Turbine Association Agenda", William H. Day, pp. 3–16, Nov., 1996.

"Proceedings of the Advanced Turbine Systems Annual Program Review Meeting", "Power Needs in the Chemical Industry", Keith Davidson, pp. 17–26, Nov., 1996.

"Proceedings of the Advanced Turbine Systems Annual Program Review Meeting", "Advanced Turbine Systems Program Overview", David Esbeck, pp. 27–34, Nov., 1996.

"Proceedings of the Advanced Turbine Systems Annual Program Review Meeting", "Westinghouse's Advanced Turbine Systems Program", Gerard McQuiggan, pp. 35–48, Nov., 1996.

"Proceedings of the Advanced Turbine Systems Annual Program Review Meeting", "Overview of GE's H Gas Turbine Combined Cycle", Cook et al., pp. 49–72, Nov., 1996.

"Proceedings of the Advanced Turbine Systems Annual Program Review Meeting", "Allison Advanced Simple Cycle Gas Turbine System", William D. Weisbrod, pp. 73–94, Nov., 1996.

"Proceedings of the Advanced Turbine Systems Annual Program Review Meeting", "The AGTSR Industry–University Consortium", Lawrence P. Golan, pp. 95–110, Nov., 1996.

"Proceedings of the Advanced Turbine Systems Annual Program Review Meeting", "$NO_x$ and CO Emissions Models for Gas–Fired Lean Premixed Combustion Turbines", A. Mellor, pp. 111–122, Nov., 1996.

"Proceedings of the Advanced Turbine Systems Annual Program Review Meeting", "Methodologies for Active Mixing and Combustion Control", Uri Vandsburger, pp. 123–156, Nov., 1996.

"Proceedings of the Advanced Turbine Systems Annual Program Review Meeting", "Combustion Modeling in Advanced Gas Turbine Systems", Paul O. Hedman, pp. 157–180, Nov., 19967.

"Proceedings of the Advanced Turbine Systems Annual Program Review Meeting", "Manifold Methods for Methane Combustion", Stephen B. Pope, pp. 181–188, Nov., 1996.

"Proceedings of the Advanced Turbine Systems Annual Program Review Meeting", "The Role of Reactant Unmixedness, Strain Rate, and Length Scale on Premixed Combustor Performance", Scott Samuelsen, pp. 189–210, Nov., 1996.

"Proceedings of the Advanced Turbine Systems Annual Program Review Meeting", "Effect of Swirl and Momentum Distribution on Temperature Distribution in Premixed Flames", Ashwani K. Gupta, pp. 211–232, Nov., 1996.

"Proceedings of the Advanced Turbine Systems Annual Program Review Meeting", "Combustion Instability Studies Application to Land–Based Gas Turbine Combustors", Robert J. Santoro, pp. 233–252.

"Proceedings of the Advanced Turbine Systems Annual Program Review Meeting", Active Control of Combustion Instabilities in Low $NO_x$ Turbines, Ben T. Zinn, pp. 253–264, Nov., 1996.

"Proceedings of the Advanced Turbine Systems Annual Program Review Meeting", "Life Prediction of Advanced Materials for Gas Turbine Application," Sam Y. Zamrik, pp. 265–274, Nov., 1996.

"Proceedings of the Advanced Turbine Systems Annual Program Review Meeting", "Combustion Chemical Vapor Deposited Coatings for Thermal Barrier Coating Systems", W. Brent Carter, pp. 275–290, Nov., 1996.

"Proceedings of the Advanced Turbine Systems Annual Program Review Meeting", "Compatibility of Gas Turbine Materials with Steam Cooling", Virnal Desai, pp. 291–314, Nov., 1996.

"Proceedings of the Advanced Turbine Systems Annual Program Review Meeting", "Bond Strength and Stress Measurements in Thermal Barrier Coatings", Maurice Gell, pp. 315–334, Nov., 1996.

"Proceedings of the Advanced Turbine Systems Annual Program Review Meeting", "Advanced Multistage Turbine Blade Aerodynamics, Performance, Cooling and Heat Transfer", Sanford Fleeter, pp. 335–356, Nov., 1996.

"Proceedings of the Advanced Turbine Systems Annual Program Review Meeting", "Flow Characteristics of an Intercooler System for Power Generating Gas Turbines", Ajay K. Agrawal, pp. 357–370, Nov., 1996.

"Proceedings of the Advanced Turbine Systems Annual Program Review Meeting", "Improved Modeling Techniques for Turbomachinery Flow Fields", B. Lakshiminarayana, pp. 371–392, Nov., 1996.

"Proceedings of the Advanced Turbine Systems Annual Program Review Meeting", "Development of an Advanced 3d & Viscous Aerodynamic Design Method for Turbomachine Components in Utility and Industrial Gas Turbine Applications", Thong Q. Dang, pp. 393–406, Nov., 1996.

"Proceedings of the Advanced Turbine Systems Annual Program Review Meeting", "Advanced Turbine Cooling, Heat Transfer, and Aerodynamic Studies", Je–Chin Han, pp. 407–426, Nov., 1996.

"Proceedings of the Advanced Turbine Systems Annual Program Review Meeting", "Heat Transfer in a Two–Pass Internally Ribbed Turbine Blade Coolant Channel with Vortex Generators", S. Acharya, pp. 427–446.

"Proceedings of the Advanced Turbine Systems Annual Program Review Meeting", "Experimental and Computational Studies of Film Cooling with Compound Angle Injection", R. Goldstein, pp. 447–460, Nov., 1996.

"Proceedings of the Advanced Turbine Systems Annual Program Review Meeting", "Study of Endwall Film Cooling with a Gap Leakage Using a Thermographic Phosphor Fluorescence Imaging System", Mingking K. Chyu, pp. 461–470, Nov., 1996.

"Proceedings of the Advanced Turbine Systems Annual Program Review Meeting", "Steam as a Turbine Blade Coolant: External Side Heat Transfer", Abraham Engeda, pp. 471–482, Nov., 1996.

"Proceedings of the Advanced Turbine Systems Annual Program Review Meeting", "Flow and Heat Transfer in Gas Turbine Disk Cavities Subject to Nonuniform External Pressure Field", Ramendra Roy, pp. 483–498, Nov., 1996.

"Proceedings of the Advanced Turbine Systems Annual Program Review Meeting", "Closed–Loop Mist/Steam Cooling for Advanced Turbine Systems", Ting Wang, pp. 499–512, Nov., 1996.

"Proceedings of the Advanced Turbine Systems Annual Program Review Meeting", "Heat Pipe Turbine Vane Cooling", Langston et al., pp. 513–534, Nov., 1996.

"Proceedings of the Advanced Turbine Systems Annual Program Review Meeting", "EPRI's Combustion Turbine Program: Status and Future Directions", Arthur Cohn, pp. 535,–552 Nov., 1996.

"Proceedings of the Advanced Turbine Systems Annual Program Review Meeting", "ATS Materials Support", Michael Karnitz, pp. 553–576, Nov., 1996.

"Proceedings of the Advanced Turbine Systems Annual Program Review Meeting", "Land Based Turbine Casting Initiative", Boyd A. Mueller, pp. 577–592, Nov., 1996.

"Proceedings of the Advanced Turbine Systems Annual Program Review Meeting", "Turbine Airfoil Manufacturing Technology", Charles S. Kortovich, pp. 593–622, Nov., 1996.

"Proceedings of the Advanced Turbine Systems Annual Program Review Meeting", "Hot Corrosion Testing of TBS's", Norman Bornstein, pp. 623–631, Nov., 1996.

"Proceedings of the Advanced Turbine Systems Annual Program Review Meeting", "Ceramic Stationary Gas Turbine", Mark van Roode, pp. 633–658, Nov., 1996.

"Proceedings of the Advanced Turbine Systems Annual Program Review Meeting", "Western European Status of Ceramics for Gas Turbines", Tibor Bornemisza, pp. 659–670, Nov., 1996.

"Proceedings of the Advanced Turbine Systems Annual Program Review Meeting", "Status of Ceramic Gas Turbines in Russia", Mark van Roode, p. 671, Nov., 1996.

"Status Report: The U.S. Department of Energy's Advanced Turbine systems Program", facsimile dated Nov. 7, 1996.

"Testing Program Results Validate GE's H Gas Turbine – High Efficiency, Low Cost of Electricity and Low Emissions", Roger Schonewald and Patrick Marolda, (no date available),.

"Testing Program Results Validate GE's H Gas Turbine – High Efficiency, Low Cost of Electricity and Low Emissions", Slide Presentation –working draft, (no date available).

"The Next Step In H... For Low Cost Per kW–Hour Power Generation", LP–1 PGE '98.

"Utility Advanced Turbine System (ATS) Technology Readiness Testing and Pre–Commercialization Demonstration", Document #486040, Oct. 1 –Dec. 31, 1996, Publication Date, Jun. 1, 1997, Report Numbers: DOE/MC/31176—5628.

"Utility Advanced Turbine System (ATS) Technology Readinesss Testing —Phase 3", Document #666274, Oct. 1, 1996–Sep. 30, 1997, Publication Date, Dec. 31, 1997, Report Numbers: DOE/MC/31176—10.

"Utility Advanced Turbine System (ATS) Technology Readiness Testing and Pre–Commercial Demonstration, Phase 3", Document #486029, Oct. 1 –Dec. 31, 1995, Publication Date, May 1, 1997, Report Numbers: DOE/MC/31176—5340.

"Utility Advanced Turbine System (ATS) Technology Readiness Testing and Pre–Commercial Demonstration – Phase 3", Document #486132, Apr. 1 –Jun. 30, 1976, Publication Date, Dec. 31, 1996, Report Numbers: DOE/MC/31176—5660.

"Utility Advanced Turbine System (ATS) Technology Readiness Testing and Pre–Commercial Demonstration — Phase 3", Document #587906, Jul. 1 –Sep. 30, 1995, Publication Date, Dec. 31, 1997, Report Numbers: DOE/MC/31176—5339.

"Utility Advanced Turbine System (ATS) Technology Readiness Testing and Pre–Commercial Demonstration" Document #666277, Apr. 1 –Jun. 30, 1997, Publication Date, Dec. 31, 1997, Report Numbers: DOE/MC/31176—8.

"Utility Advanced Turbine System (ATS) Technology Readiness Testing and Pre–Commercialization Demonstration" Jan. 1 –Mar. 31, 1996, DOE/MC/31176—5338.

"Utility Advanced Turbine System (ATS) Technology Readiness Testing: Phase 3R", Document #756552, Apr. 1 –Jun. 30, 1999, Publication Date, Sep. 1, 1999, Report Numbers: DE—FC21–95MC31176–23.

"Utility Advanced Turbine System (ATS) Technology Readiness Testing.", Document #656823, Jan. 1 –Mar. 31, 1998, Publication Date, Aug. 1, 1998, Report Numbers: DOE/MC/31176–17.

"Utility Advanced Turbine Systems (ATS) Technology Readiness Testing and Pre–Commercial Demonstration", Annual Technical Progress Report, Reporting Period: Jul. 1, 1995 –Sep. 30, 1996.

"Utility Advanced Turbine Systems (ATS) Technology Readiness Testing", Phase 3R, Annual Technical Progress Report, Reporting Period: Oct. 1, 1997 –Sep. 30, 1998.

"Utility Advanced Turbine Systems (ATS) Technology Readiness Testing", Document #750405, Oct. 1 –Dec. 30, 1998, Publication Date: May, 1, 1999, Report Numbers: DE–FC21–95MC31176–20.

"Utility Advanced Turbine Systems (ATS) Technology Readiness Testing", Document #1348, Apr. 1 –Jun. 29, 1998, Publication Date Oct. 29, 1998, Report Numbers DE–FC21–95MC31176—18.

"Utility Advanced Turbine Systems (ATS) Technology Readiness Testing –Phase 3", Annual Technical Progress Report, Reporting Period: Oct. 1, 1996 –Sep. 30, 1997.

"Utility Advanced Turbine Systems (ATS) Technology Readiness Testing and Pre–Commercial Demonstration", Quarterly Report. Jan. 1 –Mar. 31, 1997, Document #666275, Report Numbers: DOE/MC/31176–07.

"Proceedings of the 1997 Advanced Turbine Systems", Annual Program Review Meeting, Oct. 28–29, 1997.

* cited by examiner

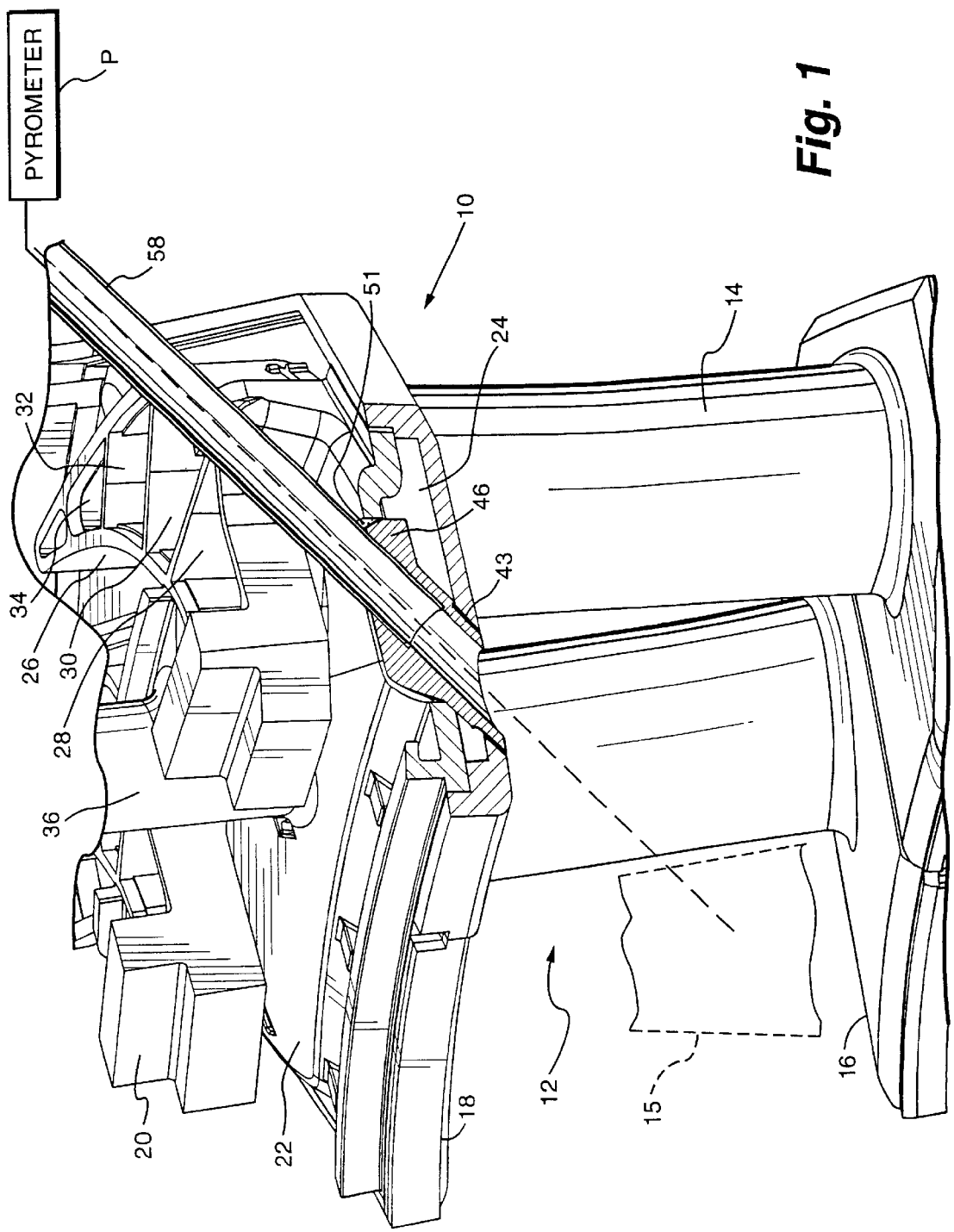

PYROMETER MOUNT FOR A CLOSED-CIRCUIT THERMAL MEDIUM COOLED GAS TURBINE

This invention was made with Government support under Contract No. DE-FC21-95MC31176 awarded by the Department of Energy. The Government has certain rights in this invention.

BACKGROUND OF THE INVENTION

The present invention relates to gas turbines having a closed-circuit thermal medium cooling system for cooling the nozzle stages and particularly relates to a pyrometer mount for a closed-circuit steam-cooled gas turbine for determining the surface temperature of gas turbine components in the hot gas path.

BRIEF SUMMARY OF THE INVENTION

In a multi-stage advanced gas turbine, the nozzle stages are cooled by a thermal medium, preferably cooling steam. The steam flows into a plenum in the outer band of the nozzle stage for impingement cooling of the outer band. The steam then flows through the vanes of the nozzle stages for impingement cooling the vanes and into a plenum in the inner band for cooling the inner band. The spent cooling steam returns from the inner band through cavities in the vanes and through the outer band. It will be appreciated that the nozzle stages lie in the hot gas path of the turbine. It has been found necessary to monitor the surface temperature of gas turbine components during operational use and particularly to monitor the operational temperature of the first-stage buckets which, of course, rotate in the hot gas path.

To accomplish this, a pyrometer is employed which has a line of sight through the steam-cooled outer band of a nozzle stage, for example, the second stage, downstream of the buckets whose operational temperature is to be measured, e.g., the first-stage buckets. As will be appreciated, the outer band and cover contain cooling steam which would normally interrupt any line of sight through the nozzle stage. That is, the pyrometer must be able to see through the cover and nozzle band along the line of sight without allowing steam to leak into the components of the gas turbine or into the hot gas path. Consequently, the present invention addresses the requirement for a pyrometer's line of sight to pass through a steam-cooled nozzle without steam leakage.

In accordance with a preferred embodiment of the present invention, a pyrometer mount is provided enabling the pyrometer's line of sight to pass through the nozzle's outer cover and outer band while providing a joint between the mount and the nozzle stage without steam leakage. It will be appreciated that the nozzle stage is formed of an array of nozzle segments circumferentially arranged about the rotor axis. In the present invention, the outer cover and band of a selected nozzle segment are provided with a pair of openings in registration with one another and angled in a forward and circumferential direction. A pyrometer boss is disposed in the openings and extends between the outer cover and the outer band, terminating along the radial inner surface of the outer band in the hot gas flow path. The radially inner portion of the pyrometer boss is electron beam welded to the outer band. Particularly, the circumferential angle of the axis of the apertures and the boss received through the apertures permits the electron beam to weld about the margin of the boss and outer band from one side of the nozzle segment. By using an electron beam welding technique, reduced distortion and a better quality weld at that location is provided.

The radial outer end of the pyrometer boss is preferably TIG-welded to the outer cover. By welding about each of the radially inner and outer ends of the boss, leakage-free joints are provided between the boss and the outer band and cover.

Upon installation of the boss in the nozzle stage segment, the boss is machined to provide a through aperture having an axis generally corresponding to the axis of the registering holes through the outer band and outer cover. Also, a seat is provided in the aperture of the boss to receive a tube coupling the boss to a pyrometer mounted on the turbine frame. Thus, a line of sight facilitating temperature readings of the first-stage bucket is established through the outer band and outer cover of a steam-cooled nozzle stage.

In a preferred embodiment of the present invention, there is provided a pyrometer mount and nozzle stage assembly for a closed-circuit thermal medium cooled gas turbine, comprising a nozzle stage segment having inner and outer bands with at least one nozzle vane extending therebetween, the bands and the vane adapted to lie in a hot gas path of the turbine, a cover spaced from the outer band and lying on a side thereof remote from the vane, the cover and the outer band defining a plenum for receiving the thermal medium, the outer band and the cover having openings therethrough in registration with one another and a pyrometer boss having an aperture therethrough disposed in the registering openings, the boss being welded to both the outer band and the cover to seal the cooling medium within the plenum without cooling medium leakage about the boss.

BRIEF DESCRIPTION OF THE DRAWINGS

FIG. 1 is a fragmentary perspective view of a nozzle stage segment with portions in cross-section illustrating a pyrometer mount according to a preferred embodiment of the present invention;

DETAILED DESCRIPTION OF THE INVENTION

Figure 3:
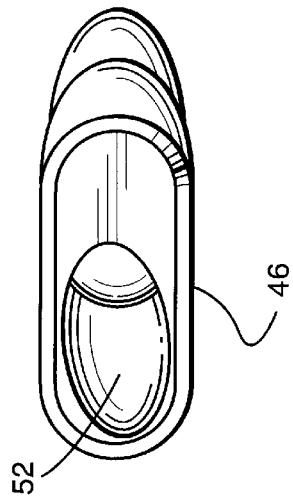
FIG. 3 is a plan view of the pyrometer mount.
Figure 4:
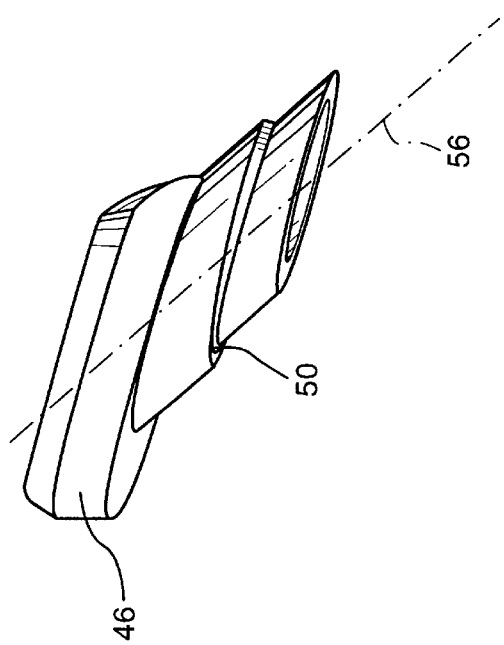
FIG. 4 is a side elevational view of the pyrometer mount.

Referring to the drawings, particularly to FIG. 1, there is illustrated a nozzle vane segment, generally designated 10. Segment 10 forms part of a circumferential array of segments joined one to the other for disposition in the hot gas path, generally designated 12, and about the axis of a turbine. The illustrated nozzle segment comprises one of the plurality of second-stage nozzle segments disposed aft of a plurality of circumferentially first-stage buckets 15. In the illustrated nozzle segment 10, the segment comprises a doublet having a pair of vanes 14 extending between radially inner and outer bands 16 and 18, respectively. It will be appreciated that the nozzle segments 10 may comprise a single vane between the inner and outer bands.

Figure 2:
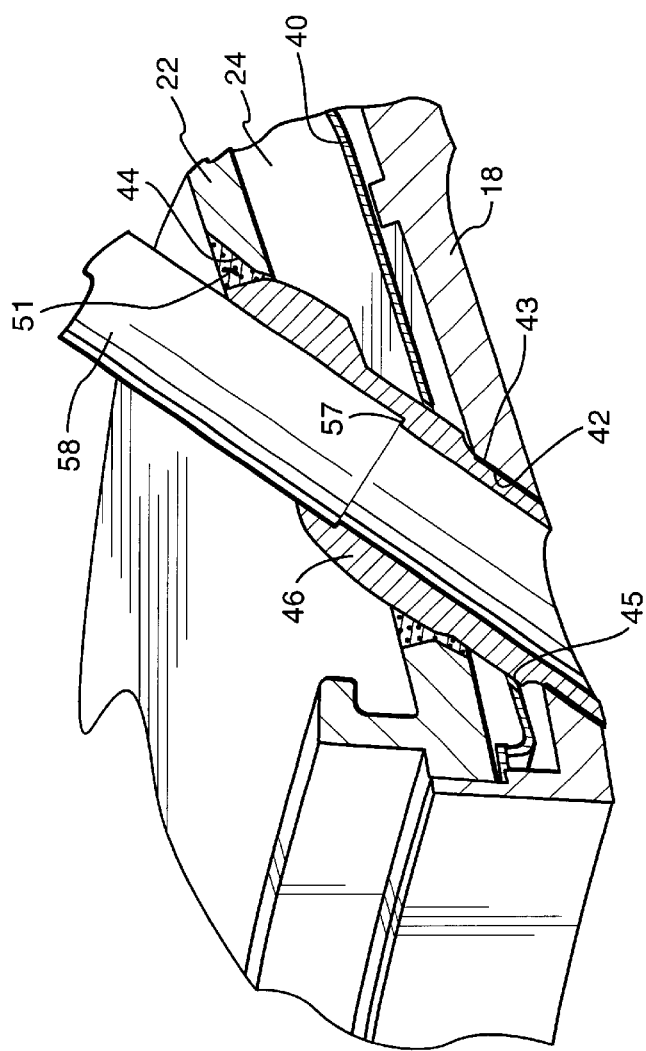
FIG. 2 is an enlarged fragmentary perspective view with portions broken out and in cross-section illustrating welds between the pyrometer mount and the nozzle stage.

Referring more particularly to FIG. 1, the outer band 18 includes a pair of radially outwardly projecting forward hooks 20 for securing the nozzle segment to the outer frame of the turbine. Additionally, FIG. 1 illustrates the outer band with a forward outer cover 22 overlying the outer band and defining a plenum 24 therewith. An aft cover, not shown, overlies the aft portion of the outer band 18 and, with the outer band 18, defines the plenum 24. As illustrated in FIG. 1, the vanes 14 have vane extensions 26 extending through the outer band. Extensions 26 form continuations of a plurality of cavities, for example, cavities 28, 30, 32 and 34, passing generally radially through the vanes 14. The cavities provide passages for flowing a thermal cooling medium, for example, steam, through the vanes 14 to the inner band 16 and returning the spent cooling steam from the inner band 16 and vanes 14. Additionally, the forward cover 22 includes a thermal cooling medium inlet 36 for supplying thermal medium, e.g., steam, to the plenum 24. Within the plenum 24, there is an impingement plate 40 (FIG. 2) for directing the received cooling steam for impingement cooling of the outer band 18. Openings, not shown, are provided in the vane extensions 26 to supply the cooling steam after impingement on the outer band through the vanes to an inner plenum between the inner band 16 and an inner cover, not shown. The cooling steam is diverted for impingement cooling of the inner band and for return flow through one of the cavities of the vanes to exit the cooling system. It will be appreciated from the foregoing discussion that steam flows through the plenum 24 defined by the outer cover 22 and outer band 18 of the second-stage nozzle vane segment 10 into the vanes and inner plenums and returns without leakage relative to the hot gas path or other turbine components.

Figure 5:
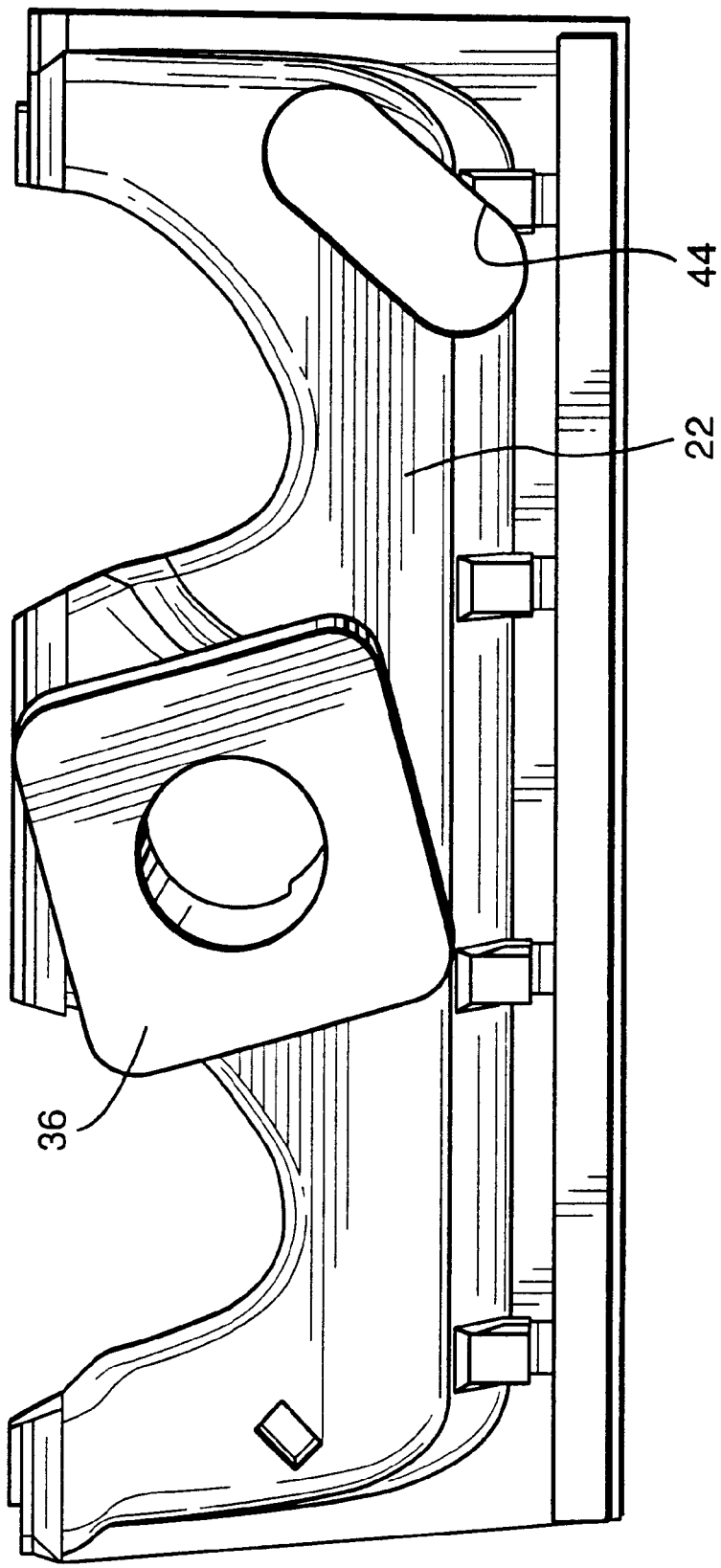
FIG. 5 is a plan view of an outer cover for the nozzle segment illustrating an opening for receiving the pyrometer mount.

To monitor the surface temperature of the buckets forwardly of this stage, for example, the first-stage buckets 15, a pyrometer P is mounted externally about the frame of the turbine and employs a line of sight 56 looking directly into the hot gas path and forwardly at the buckets of the first stage to measure the surface temperature of the buckets. The line of sight 56 must pass through the outer cover and outer band of the following stage, i.e., the second stage, if the first-stage buckets are to be observed. A pyrometer must therefore be able to see through the outer cover and outer band without allowing steam to leak from the plenum 24 into the hot gas path or other turbine components. To accomplish this, openings lying in registration with one another are formed through the outer band 18 and outer front cover 22. For example, referring to FIG. 2, an opening 42 is disposed through the outer band 18, while an opening 44 is formed through the outer front cover 22. The openings 42 and 44 register one with the other and are of a generally oval or racetrack configuration, as illustrated in FIG. 5. Additionally, from a review of FIGS. 2 and 6, it will be appreciated that a central axis passing through the registering openings 42 and 44 extends forwardly and in an angled circumferential direction, for reasons which will become clear. An opening 45 is also formed through the impingement plate 40 in registration with each of the openings 42 and 44.

A pyrometer mount, for example, a boss 46, is disposed in the registering openings 42, 44 and 45. The boss 46 is elongated and has a similar oval or racetrack configuration at its juncture with each of the openings 42, 44 and 45. The boss has a stepped body at 50 and terminates at its radially inner end in a surface which, when installed, lies flush with the radial inner surface of the outer band 18. While FIG. 3 shows the boss 46 with a linearly extending aperture 52 therethrough, it will be appreciated from the following description that the boss 46 is installed in the outer band without the aperture 52, which is later machined through the boss. Also, the boss 46 is tightly toleranced to the openings 42 and 44 through the outer band 18 and outer cover 22. Tight tolerances are not necessary between the boss 46 and the opening 45 through impingement plate 40.

Figure 6:
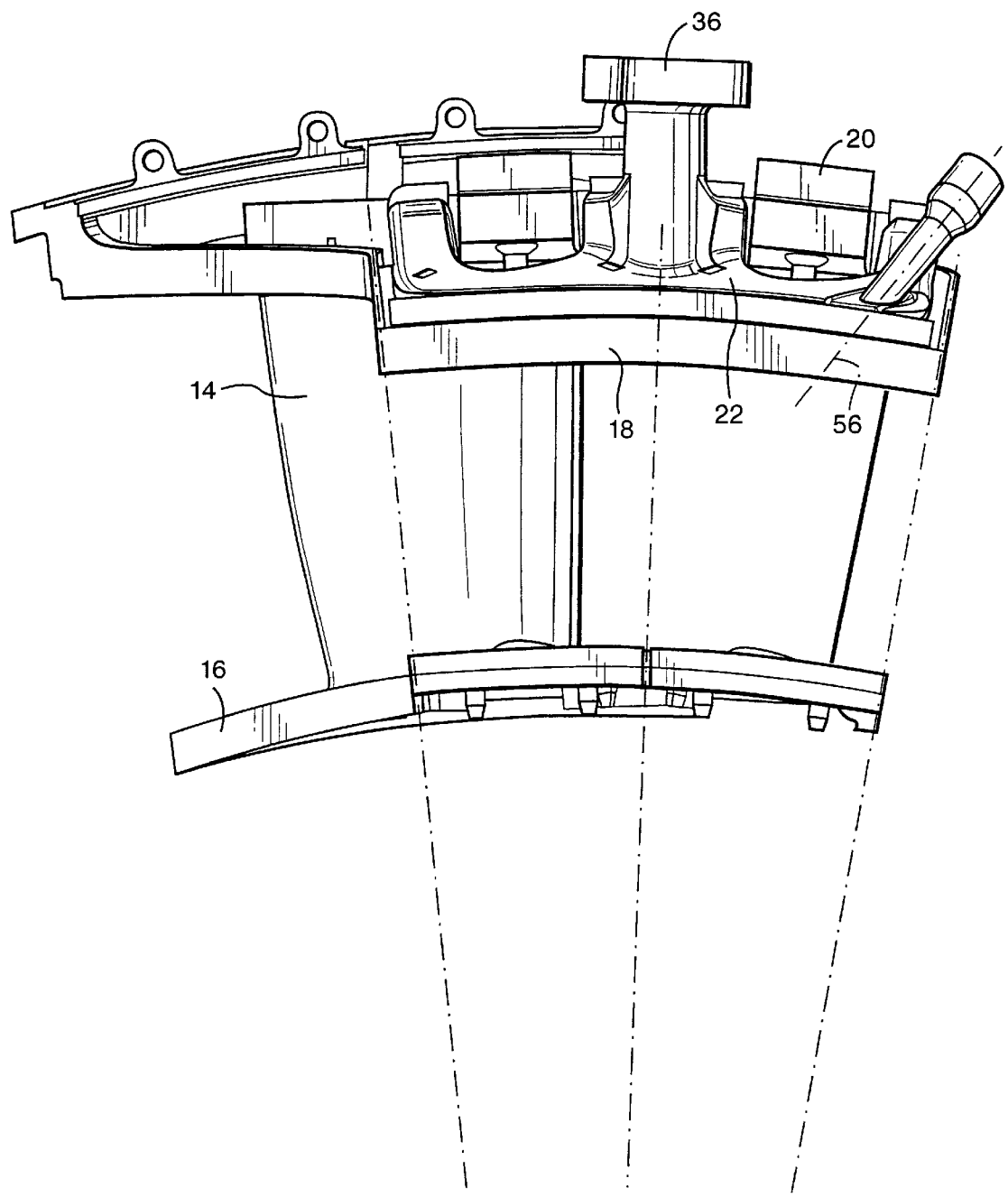
FIG. 6 is a front elevational view of the nozzle segment illustrating the location and angle of the pyrometer mount.

To install the boss in the outer band and outer cover in a manner precluding thermal cooling medium leakage from the plenum 24, the boss is inserted through the outer cover and into the outer band. The joint between the boss and the outer band 18 is electron beam-welded at 43. By angling the openings 42 and 44, as illustrated in FIG. 6, in a circumferential direction and locating the openings along one side of the segment, the electron beam of the welding apparatus can be disposed inwardly of the outer band and to one side of the segment to weld the boss to the outer band 18. Using electron beam-welding techniques reduces distortion and provides a high-quality weld 43 at the juncture of the boss and outer cover and which juncture is exposed to the high temperatures of the hot gas path. The impingement plate is then located about the boss but need not be secured or welded to the boss.

The aperture 52 is then machined through the boss 46. The axis of the aperture 52 is generally coaxial with the axis of the registering openings 42 and 44. After the aperture 52 is formed through the boss, the outer cover 22 is placed on the segment in a radial direction and then displaced aft to accommodate the boss. This provides a gross fit between the forward outer cover opening 44 and the boss 46. A TIG-weld 51 is then provided to secure the boss to the outer cover, as well as to fill the gap between the opening 44 and the boss 46 to prevent leakage of the steam through the outer cover. The aperture 52 through the boss is also provided with a seat 57 for receiving the radial inner end of a pyrometer tube 58 which is coaxial with the axis of the aperture 52 through the boss. In this manner, the pyrometer mounted about the turbine frame has a clear, linearly extending line of sight 56 to the buckets of the stage forwardly of the nozzle stage receiving the boss, in this instance, the first-stage buckets. Consequently, the surface temperature of the first-stage buckets can be readily measured by the pyrometer.

The openings through the cover and outer band are skewed in forward and circumferential directions. The aperture 52 through the boss is similarly angularly oriented. Particularly, the line of sight axis 56 (FIG. 6) extends forwardly at an acute angle to a plane normal to the rotor axis and at an acute angle relative to an axial plane intersecting the axis of the aperture. The line of sight angle facilitates the electron beam welding of the boss to the outer band.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A pyrometer mount and nozzle stage assembly for a closed-circuit thermal medium cooled gas turbine, comprising:

a nozzle stage segment having inner and outer bands with at least one nozzle vane extending therebetween, said bands and said vane adapted to lie in a hot gas path of the turbine;

a cover spaced from said outer band and lying on a side thereof remote from said vane, said cover and said outer band defining a plenum for receiving the thermal medium;

said outer band and said cover having openings therethrough in registration with one another; and a pyrometer boss having an aperture therethrough disposed in said registering openings, said boss being welded to both said outer band and said cover to seal the cooling medium within the plenum without cooling medium leakage about the boss.

2. An assembly according to claim 1 wherein said boss is electron beam-welded to said outer band.

3. An assembly according to claim 1 wherein said boss is TIG-welded to said cover.

4. An assembly according to claim 1 wherein said boss is electron beam-welded to said outer band and TIG-welded to said cover.

5. An assembly according to claim 1 wherein said aperture through said boss extends linearly between opposite ends thereof and along an axis skewed from a rotary axis of the turbine.

6. An assembly according to claim 1 wherein said aperture has a linearly extending axis and a seat for receiving an end of a linear tube disposed coaxially within the aperture and into said boss.

7. An assembly according to claim 1 including an impingement plate within said plenum and spaced between said outer band and said cover and an opening in said impingement plate in registration with the openings in said outer band and said cover for receiving the boss.

8. An assembly according to claim 1 wherein said nozzle stage is the second stage of a multi-stage turbine, said aperture having a linearly extending axis, said boss being disposed such that the linearly extending axis of said aperture extends into the gas path defined by a first stage of said multi-stage turbine.

9. An assembly according to claim 1 wherein said aperture has a linear axis which extends (i) in a forward direction and forms an acute angle with a plane normal to the axis of rotation of the turbine and (ii) in a circumferential direction and forms an acute angle with an axial plane intersecting the axis of said aperture.

* * * * *